US007006000B2

(12) United States Patent
Tung et al.

(10) Patent No.: US 7,006,000 B2
(45) Date of Patent: Feb. 28, 2006

(54) EARTHQUAKE DETECTING AND WARNING DEVICE

(76) Inventors: Kung-Chao Tung, No. 24, Chi E. St., Taipei City (TW); Po-Cheng Tung, No. 24, Chi E. St., Taipei City (TW)

( * ) Notice: Subject to any disclaimer, the term of this patent is extended or adjusted under 35 U.S.C. 154(b) by 89 days.

(21) Appl. No.: 10/861,349

(22) Filed: Jun. 7, 2004

(65) Prior Publication Data

US 2005/0270168 A1 Dec. 8, 2005

(51) Int. Cl.
*G08B 21/00* (2006.01)

(52) U.S. Cl. .......................... 340/690; 73/649; 73/579; 73/594; 73/658; 200/61.52

(58) Field of Classification Search ................ 340/690; 73/649, 579, 594, 658; 200/61.52
See application file for complete search history.

(56) References Cited

U.S. PATENT DOCUMENTS 4,689,997 A * 9/1987 Windisch ..................... 73/652
5,633,463 A * 5/1997 Szasz .......................... 73/654
5,837,951 A * 11/1998 Kato et al. ............ 200/61.45 R
6,121,888 A * 9/2000 Bognar ....................... 340/690
6,459,379 B1 * 10/2002 Ho ............................ 340/601
6,707,187 B1 * 3/2004 Gabrys ........................ 310/74

* cited by examiner

*Primary Examiner*—Daniel Wu
*Assistant Examiner*—Edny Labbees

(57) ABSTRACT

An earthquake detecting and warning device for detecting a vibration of the earth's surface is provided. The device includes a base, a top cover, at least a contact-conducting piece, a detecting and warning circuit, a shelling body and an elastic supporting component. When an earthquake occurs, the shelling body will receive the vibration from all direction to swing accordingly so that the lower portion of the shelling body will be contacted with a corresponding set of contact-conducting piece mounted on a plate body of the base to form a loop with the detecting and warning circuit. Therefore, a sound unit will generate a warning voice to inform the user. Then, the user can interrupt the warning voice through pressing a pressing component so as to press the shelling body so that the lower portion of the shelling body will totally and simultaneously connected with all sets of contact-conducting pieces.

17 Claims, 10 Drawing Sheets

EARTHQUAKE DETECTING AND WARNING DEVICE

BACKGROUND OF THE INVENTION

1. Field of the Invention

The present invention is related to an earthquake detecting and warning device, and more particularly to an earthquake detecting and warning device which can detect a vertical shake and a horizontal swing of the earth's surface and simultaneously inform the user an earthquake message through a detecting and warning circuit thereof 2. Description of the Prior Art As we had known, an earthquake might be the baleful enemy in the world and the disasters caused thereby are inestimable. In the past, without a developed scientific knowledge, people always explain the earthquake based on the supernatural.

Because of the development of the society, modem people now have a scientific insight for this kind of natural disaster.

Generally, the earthquake wave accompanying the earthquake will cause huge disasters. As the earthquake occurs, the earthquake waves come in all directions mainly include longitudinal waves and transverse waves. The longitudinal wave (P wave) means an oscillation and a propagation thereof have an identical direction, and a underground longitudinal wave can bring a vertical shake at the earth's surface. The transverse wave (S wave) means an oscillation and a propagation thereof have an perpendicular direction, and a underground transverse wave can bring a horizontal swing at the earth's surface. The transverse waves are always the reason why the buildings are destroyed during the earthquake.

However, because the occurrence of the earthquake is always fast and unconscious, the time for pre-warning is always very short and transient. Under the meteorological level now, it is still difficult to pre-warn the residents the earthquake, just like typhoon, for preventing the damage and only can be made up after the earthquake.

But, the earthquake is not completely unconscious, especially a huge earthquake. Several days or few hours before the huge earthquake, dozens to hundreds of minor earthquakes will occur, which are so called pre-earthquake.

Such as, in 1512, a huge earthquake occurred at southwest part of mainland China in August, but the minor earthquakes ware occurred for thirteen days in May. Furthermore, according to some history records of China, it also revealed that few months or few days before a huge earthquake, the pre-earthquake might be occurred.

Because of observation, people now know that a series of minor earthquakes might occur before a huge earthquake, and thus, it should be possible to remind the residents to pay attention to the huge earthquake through a detection of the pre-earthquake for preventing the damage.

However, the minor earthquakes prior to the huge earthquake sometimes are unconscious, and although the meteorological prediction might detect these minor earthquakes, it still can not announce an earthquake message at liberty without a 100% evidence. But, once a huge earthquake occurs, it might be too late.

Moreover, because the longitudinal wave has a faster propagation speed than the transverse wave inside the earth, the longitudinal wave can always arrive the earth's surface before the transverse wave. Therefore, it is obvious that the longitudinal wave can give us a warning that the transverse wave which causes the distortion of buildings is coming so that we can be prepared. Furthermore, if the earthquake occurs at midnight or people under concentrated working, the sense to the earth's surface might become blunt so as to miss the golden time for preparation.

Because of the suddenness of the earthquake, shortness of response time and insufficient alertness to the earthquake for people, the applicant keeps on carving unflaggingly to develop an earthquake detecting and warning device for an intelligent transportation managing system through wholehearted experience and research.

SUMMARY OF THE INVENTION

The main object of the present invention is to provide an earthquake detecting and warning device which can be adjusted to detect a longitudinal wave and transverse wave having a magnitude larger than a specific one and simultaneously have a warning voice so that people can quickly response to the earthquake so as to reduce the damage. For achieving the purpose described above, the present invention includes a base, an elastic supporting component, at least one contact-conducting piece, a shelling body and a detecting and warning circuit. The base comprises a plate body having three sets of supporting pillars. The elastic supporting component made of a conducting material penetrates the plate body from a bottom surface of the plate body. The contact-conducting piece is circularly mounted on the plate body. The shelling body made of a conducting material is mounted on the base, wherein the shelling body is suspended above the base a proper distance through an elastic supporting force provided by the elastic supporting component, and a lower portion of the shelling body is exactly positioned above the contact-conducting piece. The detecting and warning circuit is mounted on the base for respectively conducting the elastic supporting component and the contact-conducting piece.

According to the structure described above, when an earthquake occurs, the shelling body can be laterally swung in accordance with a shaking direction of the earthquake wave and the lower portion of the shelling body will be contacted with the contact-conducting piece mounted on the plate body to form a loop with the detecting and warning circuit so that a sound unit will sound a warning voice to inform the user. Furthermore, the user can interrupt the warning voice from the detecting and warning circuit through pressing a pressing component which will force the shelling body to move downwardly for simultaneously contacting with all contact-conducting pieces.

These features and advantages of the present invention will be fully understood and appreciated from the following detailed description of the accompanying Drawings.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The present invention will now be described more specifically with reference to the following embodiments.

Figure 1:
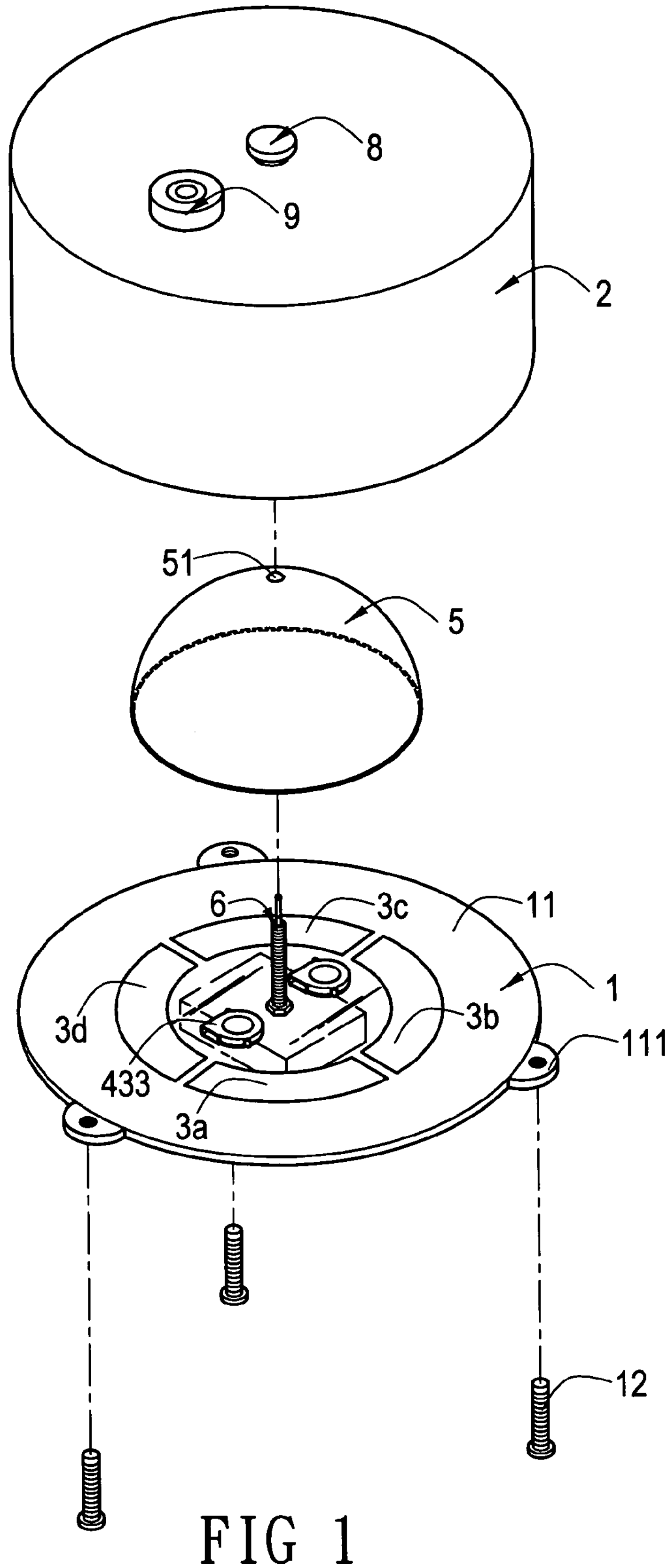
FIG. 1 is a exploded perspective view showing an earthquake detecting and warning device according to the present invention.
Figure 3:
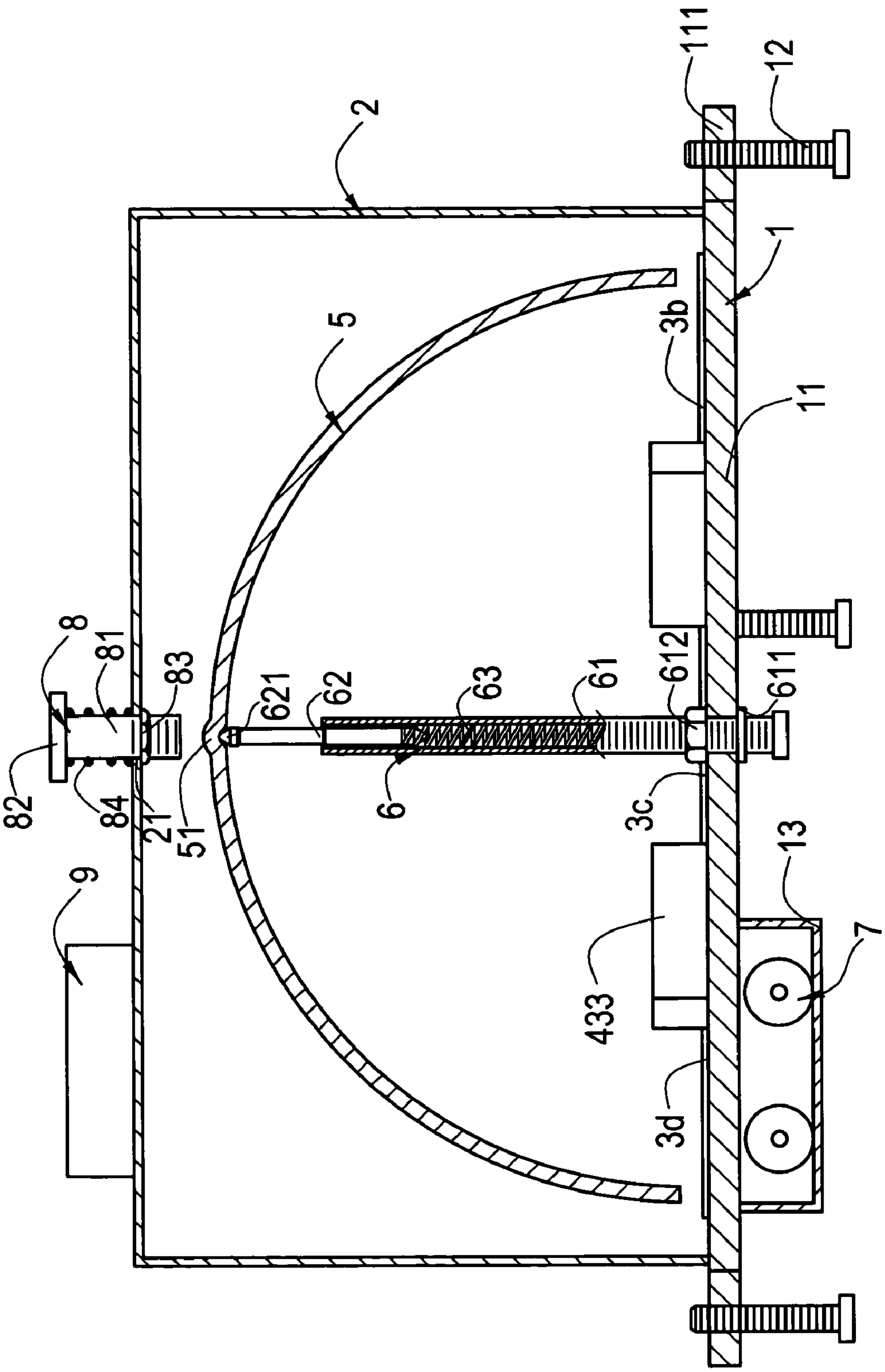
FIG. 3 is a sectional view showing the earthquake detecting and warning device according to the present invention.

Firstly, please refer to FIGS. 1 and 3. The earthquake detecting and warning device of the present invention can detect a vibration of the earth's surface and includes a base 1, a top cover 2, a first contact-conducting piece 3*a*, a second contact-conducting piece 3*b*, a third contact-conducting piece 3*c*, a fourth contact-conducting piece 3*d*, a detecting and warning circuit 4, a shelling body 5, an elastic supporting component 6, a power source 7 and a pressing component 8.

Figure 2:
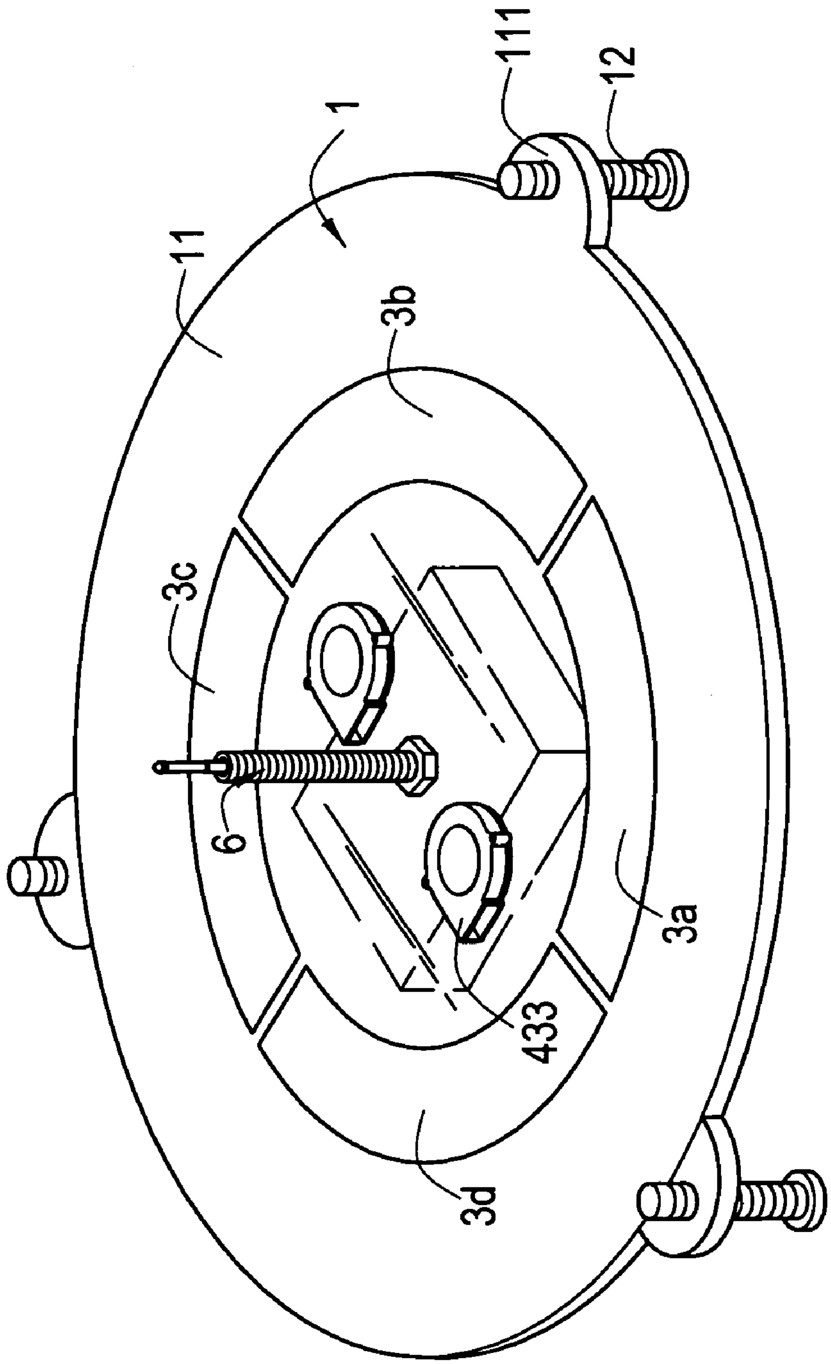
FIG. 2 is a perspetive view showing a base of the earthquake detecting and warning device according to the present invention.

As shown in FIGS. 2 to 3, the base 1 comprises a plate body 11 having three sets of supporting pillars 12, wherein the plate body 11 comprises three sets of protruding portions 111 mounted therearound so that the supporting pillars 12 with threads thereon are employed to support the plate body 11 through rotationally supporting the protruding portions 111 from a bottom surface thereof and control the height and the level of the plate body 11, and a containing case 13 is positioned at a bottom surface of the plate body 11.

As shown in FIGS. 1 and 3, the top cover 2 is mounted above the base 1, a spirit level 9 is further mounted at the top of the top cover 2 for measuring the level of the plate body 11 of the base 1 and a receiving hole 21 is mounted at a central top portion of the top cover 2.

As shown in FIGS. 1 and 2, the first contact-conducting piece 3*a*, the second contact-conducting piece 3*b*, the third contact-conducting piece 3*c*, the fourth contact-conducting piece 3*d* are sequentially and circularly mounted at four corners of the plate body 11.

Figure 7:
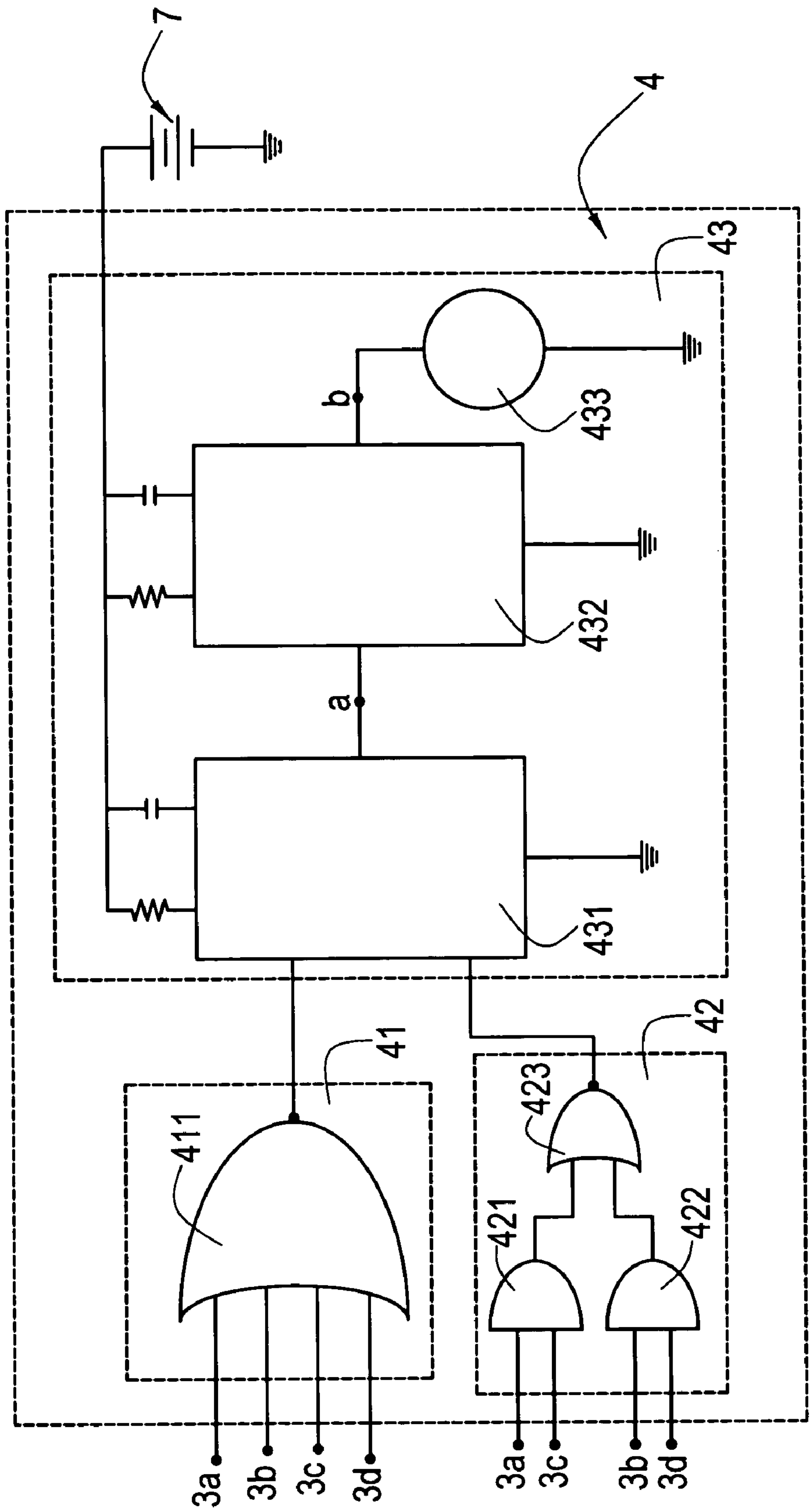
FIG. 7 is a circuit block of the earthquake detecting and warning device according to the present invention.
Figure 8:
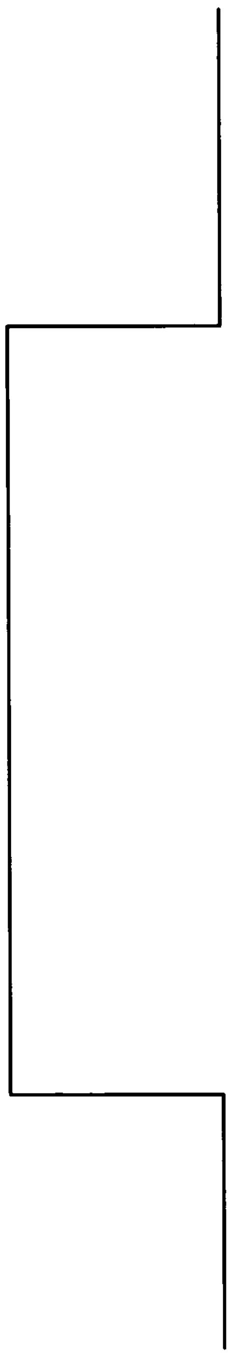
FIG. 8 is an oscillogram showing the pulse signal of long wave of the earthquake detecting and warning device according to the present invention.
Figure 9:
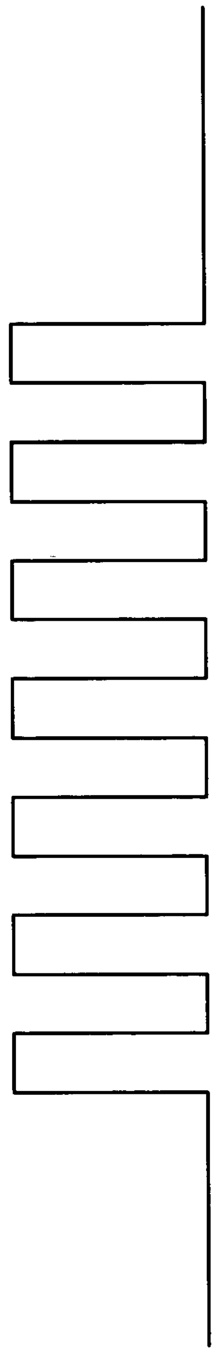
FIG. 9 is an oscillogram showing the pulse signal of short wave of the earthquake detecting and warning device according to the present invention.
Figure 10:
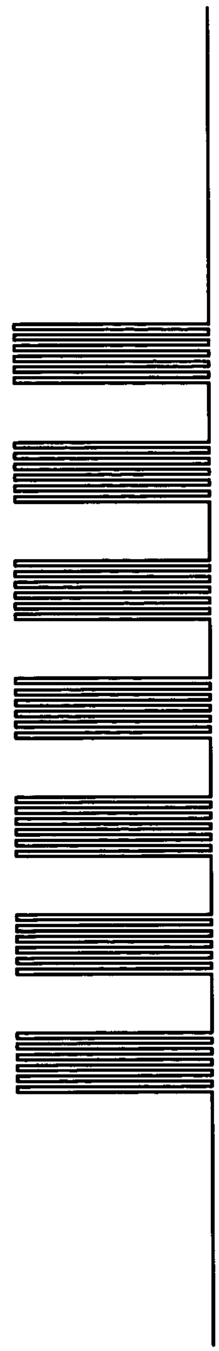
FIG. 10 is an oscillogram showing the pulse signal of a buzzer of the earthquake detecting and warning device according to the present invention.

As shown in FIG. 7, the detecting and warning circuit 4 is mounted on the base 1 and respectively connected to each set of contact-conducting pieces. The detecting and warning circuit 4 comprises a detecting and initiating circuit 41 and a detecting and shutting down circuit 42, each of which is respectively connected to a sound circuit 43.

The detecting and initiating circuit 41 includes a first OR gate 411 having input terminals respectively connected to the first contact-conducting piece 3*a*, the second contact-conducting piece 3*b*, the third contact-conducting piece 3*c* and the fourth contact-conducting piece 3*d*, and signals determined by the first OR gate 411 are transmitted into the sound circuit 43 so as to initiate the sound circuit 43.

The detecting and shutting down circuit 42 includes a first AND gate 421 and a second AND gate 422 respectively connected to an input terminal of a second OR gate 423. Input terminals of the first AND gate 421 are respectively conducted with the first contact-conducting piece 3*a* and the second contact-conducting piece 3*b*. Input terminals of the second AND gate 422 are respectively conducted to the third and the fourth contact-conducting pieces. Signals determined by the first AND gate 421 and the second AND gate 422 are output to the second OR gate 423 for determination, and signals determined by the second OR gate 423 are transmitted into the sound circuit 43 so as to shut down the sound circuit 43.

As shown in FIGS. 7 to 10, the sound circuit 43 comprises a first single steady state circuit 431, a second single steady state circuit 432 and a buzzer 433 sequentially connected together. The first single steady state circuit 431 will send a pulse signal of long wave "a" and the second single steady state circuit 432 will send a pulse signal of continuous short wave "b".

Moreover, the first OR gate 411 of the detecting and warning circuit 41 and the second OR gate 423 of the detecting and shutting down circuit 42 respectively transmit the determined signals into the first single steady state circuit 431 and thereby controlling an initiation and a shut down of the sound circuit 43. When the sound circuit 43 is initiated, the pulse signal of long wave "a" from the first single steady state circuit 431 and the pulse signal of continuous short wave "b" from the second single steady state circuit 432 are sent to the buzzer 433 to sound a warning voice frequency having a pulse signal of a specific length.

As shown in FIGS. 1 and 3, the shelling body 5 has an overturned bowl shape and is made of a conducting material. The shelling body 5 is located between the top cover 2 and the base 1, and is suspended above the plate body 11 a proper distance. Furthermore, a lower portion of the shelling body 5 is exactly positioned above the first contact-conducting piece 3*a*, the second contact-conducting piece 3*b*, the third contact-conducting piece 3*c* and the fourth contact-conducting piece 3*d*, and a positioning groove 51 is mounted at a central top portion of the shelling body 5.

Figure 4:
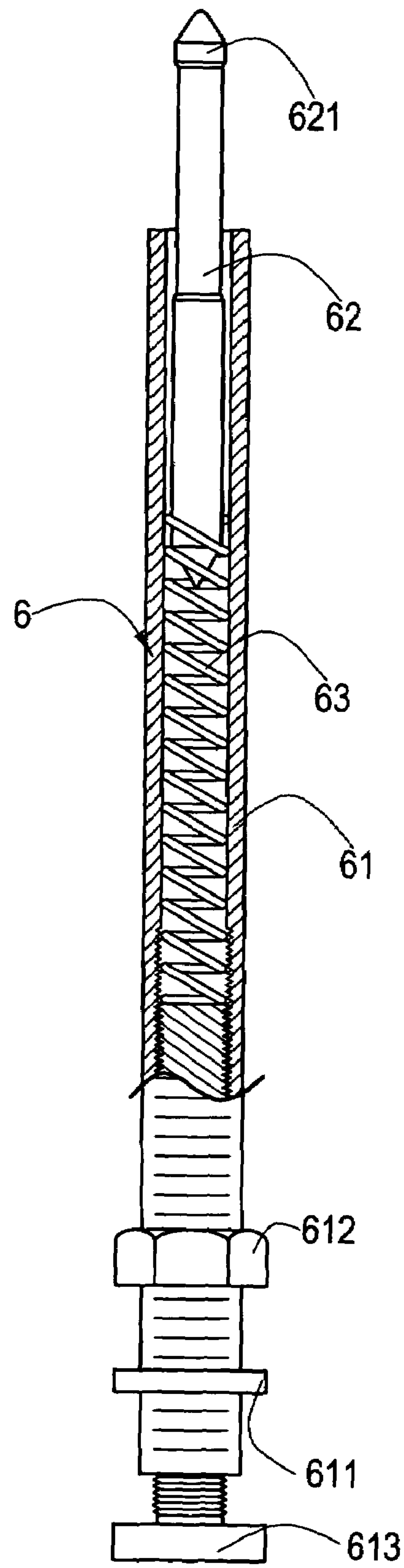
FIG. 4 is a sectional view showing an elastic supporting component of the earthquake detecting and warning device according to the present invention.
Figure 5:
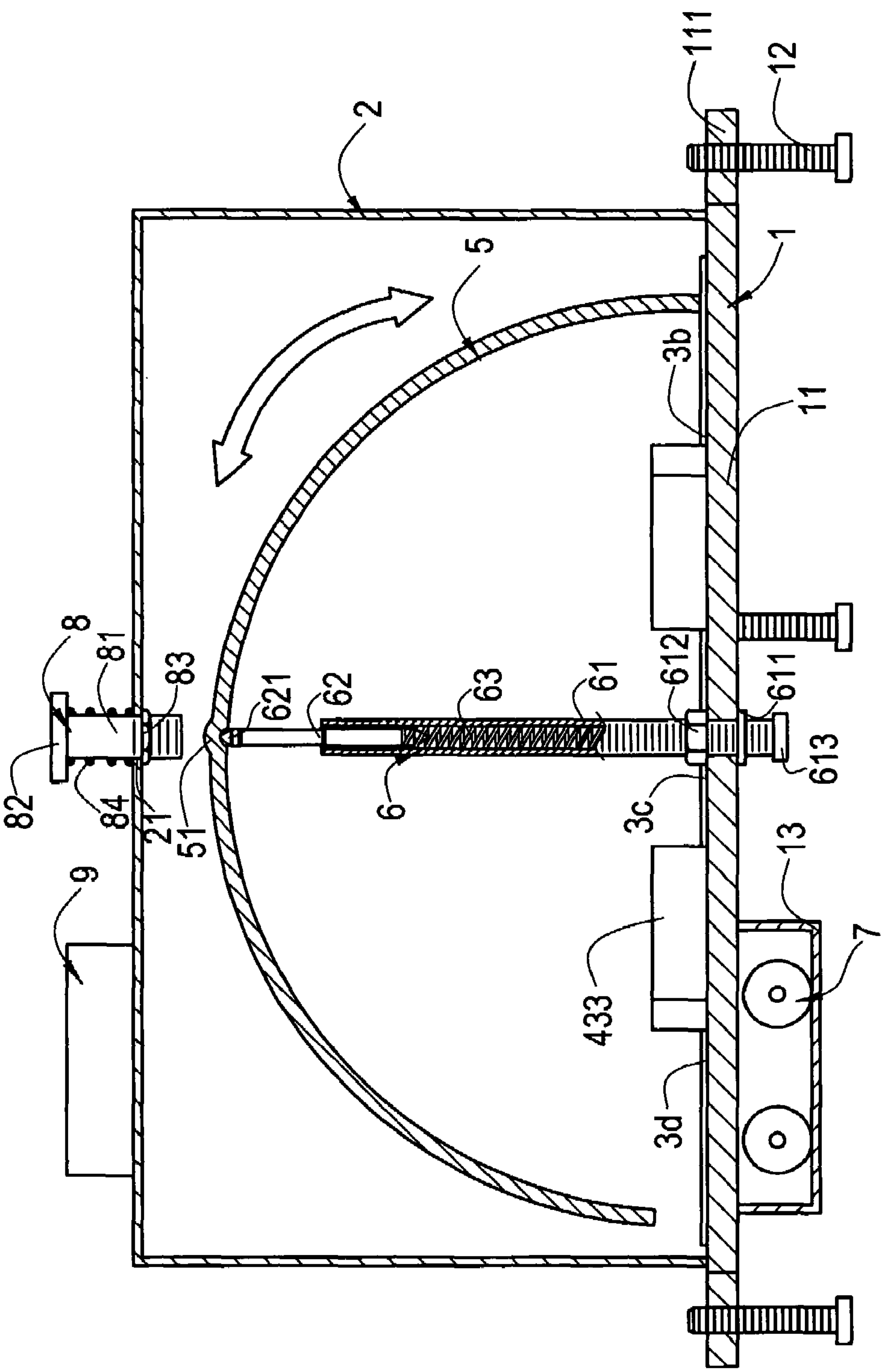
FIG. 5 is a schematic view showing a first movement of the earthquake detecting and warning device according to the present invention.
Figure 6:
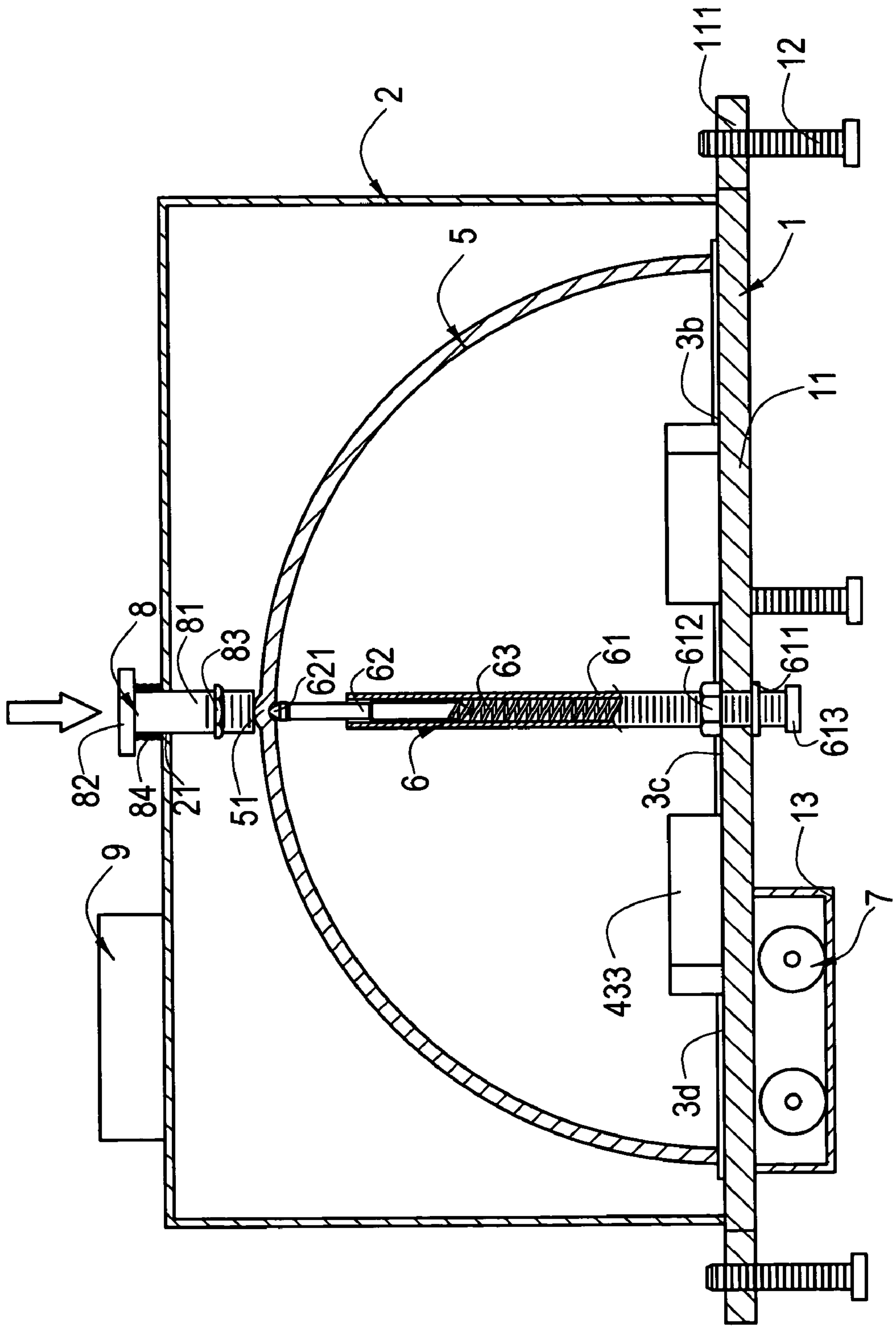
FIG. 6 is a schematic view showing a second movement of the earthquake detecting and warning device according to the present invention.

As shown in FIGS. 1, 3 and 4, the elastic supporting component 6 is made of a conducting material and includes a thread sleeve 61, a supporting shaft 62 and a compression resisting spring 63.

The thread sleeve 61 positions from a bottom surface of the plate body 11 and has an adjusting portion 611 mounted at a bottom portion thereof. A fixing nut 612 is sleeved on the thread sleeve 61 for positioning the thread sleeve 61 on the plate body 11.

The supporting shaft 62 is plugged in the thread sleeve 61 and has a top sharp portion 621 corresponding to the positioning groove 51 at a top portion thereof. The supporting shaft 62 is plugged in the positioning groove 51 for supporting the shelling body 5 to be suspended above the base 1 a proper distance.

The compression resisting spring 63 is mounted between the thread sleeve 61 and the supporting shaft 62, and inside the thread sleeve 61 for providing an upward supporting force to the supporting shaft 62.

In addition, an adjusting screw 631 is further mounted at the bottom portion of the thread sleeve 61 for urging against the compression resisting spring 63 so as to adjust a contact distance between the shelling body 5 and the contact-conducting pieces 3 and control the sensitivity.

As shown in FIG. 3, the power source 7 is positioned inside the containing case 13 and comprises two sets of batteries. The positive and negative electrodes of the power source are respectively conducted to the elastic supporting component 6 and the detecting and warning circuit 4.

As shown in FIGS. 1 and 3, the pressing component 8 is mounted in a receiving hole 21, which is located at a central top portion of the top cover 2 above the shelling body 5, and is a proper distance away from the shelling body 5. The pressing component 8 comprises a pressing strip 81, an operating portion 82 mounted on the pressing strip 81, a limiting ring 83 mounted at a lower portion of the pressing strip 81 and an elastic unit 84 sleeved on the pressing strip 81 between the top cover 2 and the operating portion 82 so that after the pressing strip 81 is rotationally mounted in an upper portion of the top cover 2, the pressing strip 81 is limited by the limiting ring 83 to be vertically moved between the operating portion 82 and the limiting ring 83.

According to the structure described above, referring to FIGS. 1, 3, 5 and 7, the supporting pillars 12 mounted on the plate 11 of the base 1 of the earthquake detecting and warning device can firstly be adjusted according to the spirit level 9 for maintaining the level of the plate body 11. Then, when an earthquake occurs, the compression resisting spring 63 of the elastic supporting component 6 will be upwardly and downwardly sprung in accordance with a shaking direction of the longitudinal wave so as to affect the top sharp portion 621 of the supporting shaft 62 above the elastic supporting component 6 to spring upwardly and downwardly. Afterwards, the shelling body 5 will be shaken by the vibration of the top sharp portion 621 so that the lower portion of the shelling body 5 will be shortly contacted and conducted with any set of the first contact-conducting piece 3*a*, the second contact-conducting piece 3*b*, the third contact-conducting piece 3*c* and the fourth contact-conducting piece 3*d* mounted around the plate body 11 of the base 1. Therefore, the detecting and initiating circuit 41 of the detecting and warning circuit 4 will become a loop so that the detecting and initiating circuit 41 of the detecting, and warning circuit 4 will send a signal to the sound circuit 43. The pulse signal "a" of long wave and the pulse signal "b" of continuous short wave respectively from the first single steady state circuit 431 and the second single steady state circuit 432 of the sound circuit 43 are sent to the buzzer 433 to sound a warning voice frequency having a pulse signal of a specific length to inform the user. When an earthquake occurs and the earthquake wave is a transverse wave, the compression resisting spring 63 of the elastic supporting component 6 will be laterally swung in accordance with a shaking direction of the transverse wave so as to affect the top sharp portion 621 of the supporting shaft 62 above the elastic supporting component 6 to swing laterally. Identically, the shelling body 5 will be shaken by the vibration of the top sharp portion 621 so that the lower portion of the shelling body 5 will be shortly contacted and conducted with any set of the first contact-conducting piece 3*a*, the second contact-conducting piece 3*b*, the third contact-conducting piece 3*c* and the fourth contact-conducting piece 3*d* mounted around the plate body 11 of the base 1 to form a loop. Then, the buzzer 433 will sound a warning voice frequency having a pulse signal of a specific length to inform the user.

As shown in FIGS. 1, 3, 6 and 7, when the user is aware of the earthquake, the user can interrupt the warning voice from the sound circuit 43 through pressing the operating portion 82 of the pressing component 8 to make the pressing strip 81 to urge against the shelling body 5. Because the downward pressure suffered by the shelling body 5 is larger than the resistance provided by the compression resisting spring 63 through the supporting shaft 62 to support the shelling body 5, the lower portion of the shelling body 5 is totally contacted with the first contact-conducting piece 3*a*, the second contact-conducting piece 3*b*, the third contact-conducting piece 3*c* and the fourth contact-conducting piece 3*d* to form a loop. Therefore, the detecting and shutting down circuit 42 of the detecting and warning circuit 4 will be driven to send a signal to the sound circuit 43 for interruption.

Furthermore, as shown in FIGS. 1~3, the thread sleeve 61 of the elastic supporting component 6 can rotationally adjust the length thereof above the plate body 11 according to the detection of the desired smallest earthquake wave so as to adjust the shelling body 5 to be suspended above the plate body 11 a specific proper distance. The smaller the distance, the shelling body 5 is easier to be affected by the swing caused from the earthquake wave to contact and conduct with the circuit board so that the better the sensitvity to the earthquake.

Figure 11:
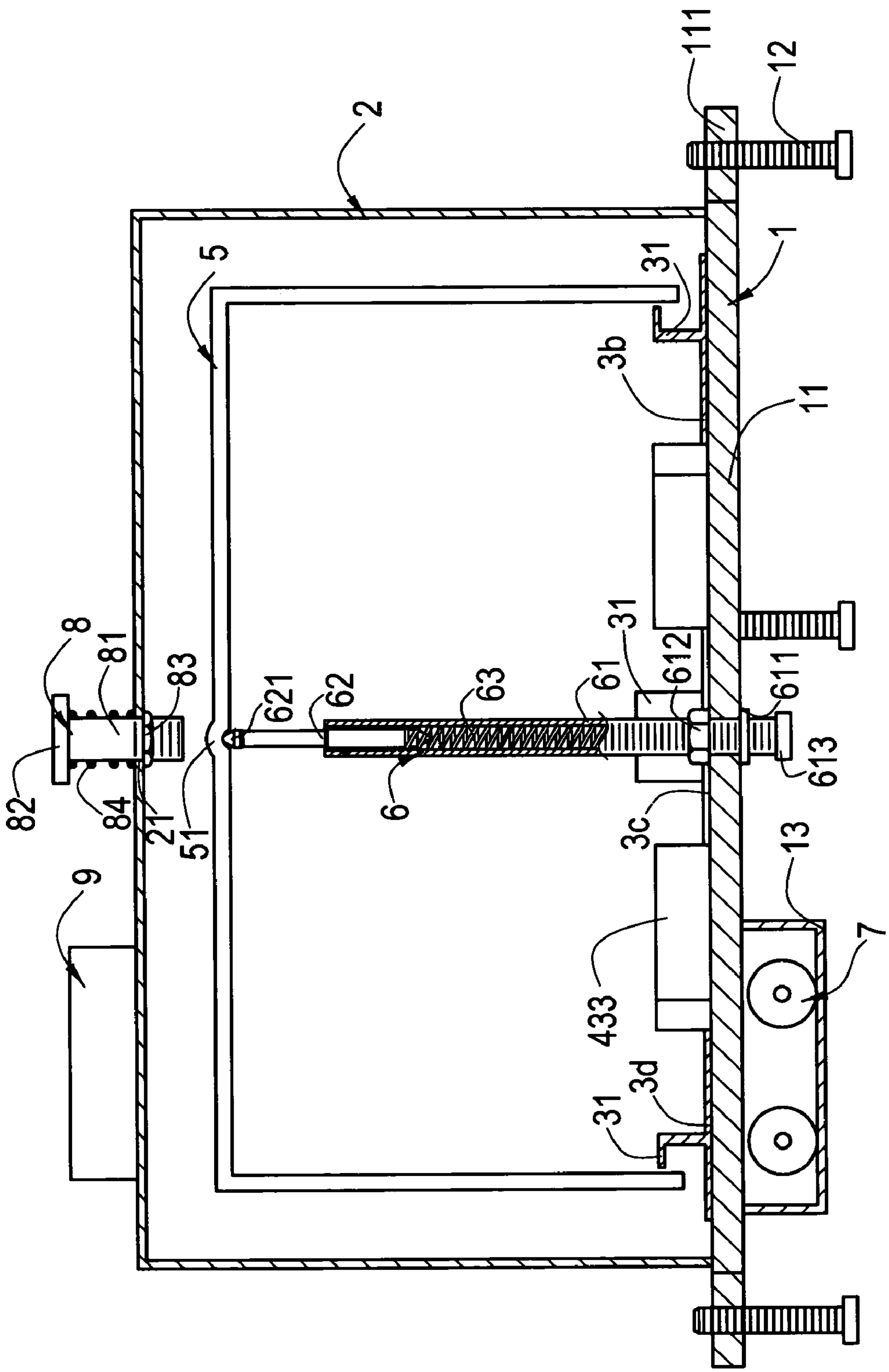
FIG. 11 is a schematic view showing the earthquake detecting and warning device in another preferred embodiment according to the present invention.

According to another preferred embodiment of the present invention, as shown in FIG. 11, the shelling body 5 has a cylinder shape and each of the first contact-conducting piece 3*a*, the second contact-conducting piece 3*b*, the third contact-conducting piece 3*c* and the fourth contact-conducting piece 3*d* has a contact-conducting wing extended therefrom.

According to the structure described above, when an earthquake occurs, the compression resisting spring 63 of the elastic supporting component 6 will be upwardly and downwardly sprung in accordance with a shaking direction of the longitudinal wave so as to affect the top sharp portion 621 of the supporting shaft 62 above the elastic supporting component 6 to spring upwardly and downwardly. The shelling body 5 will be shaken by the vibration of the top sharp portion 621 so that the lower portion of the shelling body 5 will be shortly contacted and conducted with any set of contact-conducting wing on the first contact-conducting piece 3*a*, the second contact-conducting piece 3*b*, the third contact-conducting piece 3*c* and the fourth contact-conducting piece 3*d* mounted around the plate body 11 of the base 1 to form a loop. Then, the buzzer 433 will sound a warning voice frequency having a pulse signal of a specific length to inform the user.

Figure 12:
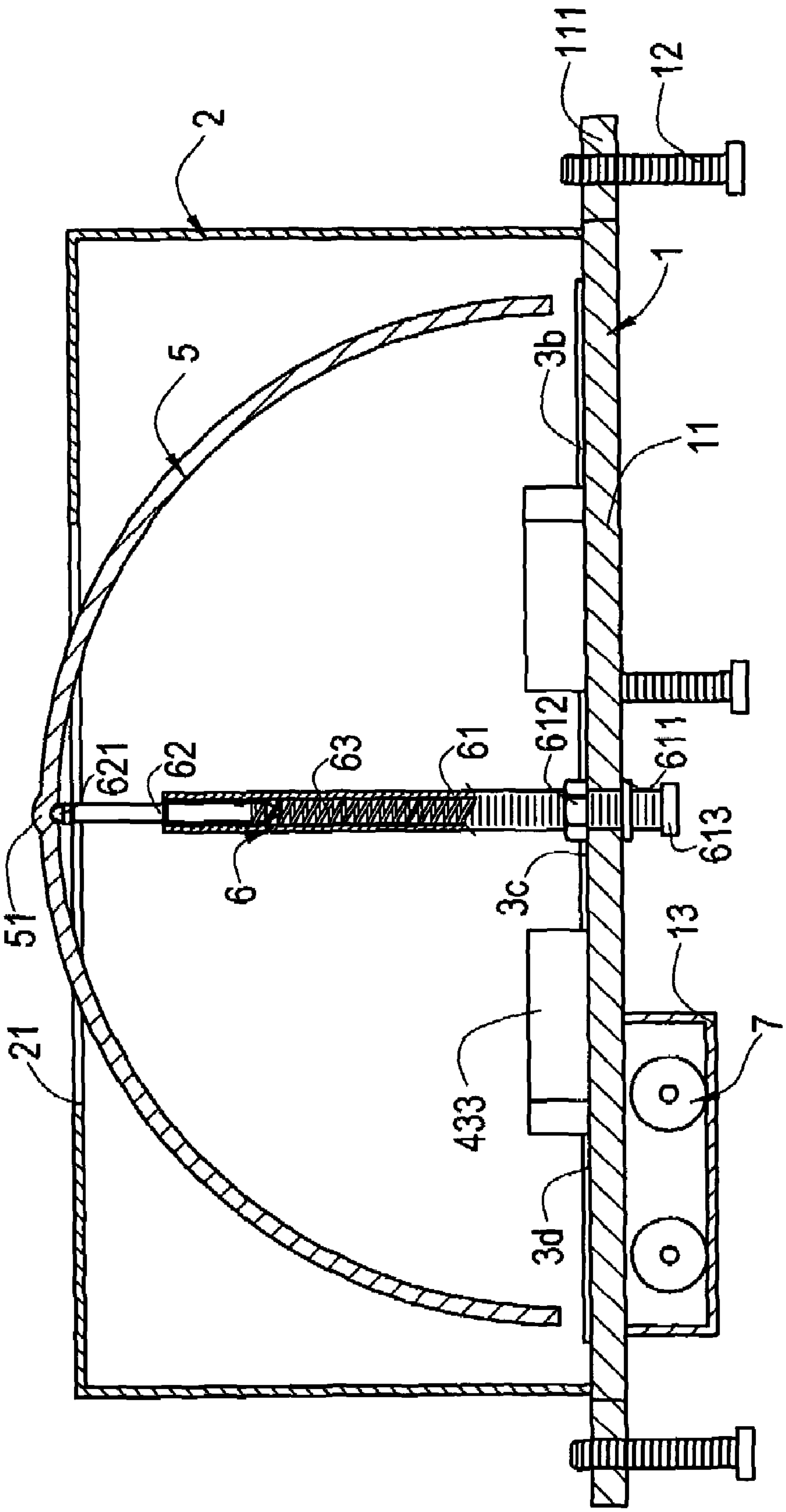
FIG. 12 is a schematic view showing the earthquake detecting and warning device in still another preferred embodiment according to the present invention

According to further another preferred embodiment of the present invention, as shown in FIG. 12, the pressing component 8 in the receiving hole 21 of the top cover 2 can be saved.

According to the structure described above, the user can interrupt the warning voice from the sound circuit 43 through directly pressing the shelling body. Because the downward pressure suffered by the shelling body 5 is larger than the resistance provided by the compression resisting spring 63 through the supporting shaft 62 to support the shelling body 5, the lower portion of the shelling body 5 is totally contacted with the first contact-conducting piece 3*a*, the second contact-conducting piece 3*b*, the third contact-conducting piece 3*c* and the fourth contact-conducting piece 3*d* to form a loop. Therefore, the detecting and shutting down circuit 42 of the detecting and warning circuit 4 will be driven to send a signal to the sound circuit 43 for interruption.

According to still another preferred embodiment of the present invention, plural sets of LED lights can be included to be respectively connected to the first contact-conducting piece 3*a*, the second contact-conducting piece 3*b*, the third contact-conducting piece 3*c* and the fourth contact-conducting piece 3*d*.

When an earthquake occurs, the shelling body 5 can be influenced to swing by the earthquake wave from any direction so as to contact the first contact-conducting piece 3*a*, the second contact-conducting piece 3*b*, the third contact-conducting piece 3*c* or the fourth contact-conducting piece 3*d*. Then, the LED light conducted to the first contact-conducting piece 3*a*, the second contact-conducting piece 3*b*, the third contact-conducting piece 3*c* or the fourth contact-conducting piece 3*d* be conducted to illuminate so that the user can be informed by the illumination and the LED light can simultaneously show the direction of the earthquake for providing more information.

After the above-described embodiment, it is known that the present invention includes the advantages as follows:

1. The present invention can detect a longitudinal wave and a transverse wave of the earthquake wave from all directions and simultaneously inform the user by warning voice for preparation.
2. The present invention has an adjustable sensitivity to the earthquake wave according to the demand of the user by rotationally adjusting the thread sleeve 61 and the adjusting screw 631.
3. The level of the plate body 11 in the present invention can be adjusted according to the demand of the user.
4. The present invention includes a shutting down circuit which can be employed to interrupt the warning voice through pressing the pressing component 8 through the user himself when the user acknowledge the earthquake.

In view of the aforesaid, the present invention can actually detect the longitudinal wave and the transverse wave of the earthquake wave and simultaneously inform the user by warning voice for preparation so as to reduce the damage. Consequently, the present invention is really a novel and progressive creation and conforms to the demand of the industry.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An earthquake detecting and warning device, comprising:

a base comprising a plate body having three sets of supporting pillars;

an elastic supporting component penetrating said plate body from a bottom surface of said plate body, wherein said elastic supporting component is made of a conducting material;

at least one contact-conducting piece circularly mounted on said plate body;

a shelling body made of a conducting material and mounted on said base, wherein said shelling body is suspended above said base a proper distance through an elastic supporting force provided by said elastic supporting component, and a lower portion of said shelling body is exactly positioned above said contact-conducting piece; and a detecting and warning circuit mounted on said base for respectively conducting said elastic supporting component and said contact-conducting piece.

2. The earthquake detecting and warning device according to claim 1, wherein said plural supporting pillars have threads thereon so that said plural supporting pillars are rotationally adjusted to control a height and a level of said plate body and base.

3. The earthquake detecting and warning device according to claim 2, wherein said plate body comprises plural protruding portions mounted therearound so that said plural supporting pillars are employed to support said plate body through rotationally supporting said protruding portions and control the height and the level of said plate body.

4. The earthquake detecting and warning device according to claim 1, wherein said elastic supporting component further comprises a thread sleeve positioning from a bottom surface of said plate body and having an adjusting portion mounted at a bottom portion thereof; a supporting shaft plugged in said thread sleeve and having a top sharp portion; and a compression resisting spring mounted between said thread sleeve and said supporting shaft and inside said thread sleeve for providing an upward supporting force, wherein an adjusting screw is further mounted at said bottom portion of said thread sleeve for urging against said compression resisting spring so as to adjust a contact distance between said shelling body and said contact-conducting piece.

5. The earthquake detecting and warning device according to claim 4, wherein said shelling body comprises a positioning groove mounted at a central top portion thereof corresponding to a position of said top sharp portion of said supporting shaft for being supported by said top sharp portion.

6. The earthquake detecting and warning device according to claim 4, wherein said thread sleeve is sleeved by a fixing nut for positioning said thread sleeve on said plate body.

7. The earthquake detecting and warning device according to claim 1, wherein a top cover is further mounted above said shelling body and said base.

8. The earthquake detecting and warning device according to claim 7, wherein said shelling body comprises a receiving hole mounted at a central top portion thereof and a pressing component mounted inside said receiving hole, wherein said pressing component is a proper distance away from said shelling body so that said pressing component is pressed down to perpendicularly press down said shelling body, said pressing component comprises a pressing strip, an operating portion mounted on said pressing strip, a limiting ring mounted at a lower portion of said pressing strip and an elastic unit sleeved on said pressing strip between said top cover and said operating portion so that after said pressing portion is rotationally mounted in an upper portion of said top cover, said pressing strip is limited to be vertically moved between said operating portion and said limiting ring.

9. The earthquake detecting and warning device according to claim 7, wherein a spirit level is further mounted at the top of said top cover for measuring the level of said plate body of said base.

10. The earthquake detecting and warning device according to claim 1, wherein said device further comprises four sets of contact-conducting pieces sequentially and circularly mounted on said plate body.

11. The earthquake detecting and warning device according to claim 1, wherein said contact-conducting piece further comprises a contact-conducting wing extended therefrom.

12. The earthquake detecting and warning device according to claim 1, wherein said detecting and warning circuit comprises a detecting and initiating circuit and a detecting and shutting down circuit respectively connected to a sound circuit and conducted to an electrode of a power source, and the other electrode of said power source is conducted to said elastic supporting component, wherein:

said sound circuit comprises a first single steady state circuit, a second single steady state circuit and a buzzer sequentially connected together, said detecting and initiating circuit and said detecting and shutting down circuit are respectively connected to said first single steady state circuit thereby controlling an initiation and a shut down of said sound circuit, and when said sound circuit is initiated, pulse signals from said first single steady state circuit and said single steady state circuit are sent to said buzzer to sound a warning voice frequency having a pulse signal of a specific length.

13. The earthquake detecting and waning device according to claim 12, wherein said detecting and initiating circuit is a first OR gate having an inputt terminal connected to said contact-conducting piece, and signals determined by said first OR gate are transmitted into said first single steady state circuit so as to initiate said sound circuit.

14. The earthquake detecting and warning device according to claim 12, wherein said detecting and shutting down circuit is a first AND gate and a second AND gate respectively connected to an inputting terminal of a second OR gate, said first AND gate and said second AND gate are individually conducted to said contact-conducting piece, signals determined by said first AND gate and said second AND gate are outputted to said second OR gate for determination, and signals determined by said second OR gate are transmitted into said first single steady state circuit of said sound circuit so as to shut down said sound circuit.

15. The earthquake detecting and warning device according to claim 12, wherein said plate body has a containing case positioned at a bottom surface thereof for positioning said power source and said power source comprises at least one set of battery.

16. The earthquake detecting and warning device according to claim 1, wherein said shelling body has an overturned bowl shape.

17. The earthquake detecting and warning device according to claim 1, wherein said shelling body has a cylinder shape.

* * * * *